United States Patent
Thistlethwaite et al.

(10) Patent No.: US 12,252,258 B2
(45) Date of Patent: Mar. 18, 2025

(54) REPLACEABLE PARACHUTE CONTAINER FLAPS

(71) Applicant: ROCKWELL COLLINS, INC., Cedar Rapids, IA (US)

(72) Inventors: Christopher Thistlethwaite, Colorado Springs, CO (US); Ronald John McCumber, Colorado Springs, CO (US); John Fox, Chelmsford, MA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 246 days.

(21) Appl. No.: 17/902,738

(22) Filed: Sep. 2, 2022

(65) Prior Publication Data

US 2024/0076046 A1    Mar. 7, 2024

(51) Int. Cl.
*B64D 17/46* (2006.01)
*B64D 25/10* (2006.01)

(52) U.S. Cl.
CPC ............. *B64D 17/46* (2013.01); *B64D 25/10* (2013.01)

(58) Field of Classification Search
CPC ..... B64D 17/46; B64D 17/40; B64D 11/0616
See application file for complete search history.

(56) References Cited

U.S. PATENT DOCUMENTS

| | | | |
|---|---|---|---|
| 2,452,604 A | 11/1948 | Selsmeyer | |
| 2,542,925 A | 2/1951 | Irving | |
| 3,032,303 A | 5/1962 | Hatfield | |
| 4,034,940 A | 7/1977 | Bird | |
| 5,951,354 A * | 9/1999 | Johnson | A63H 27/14 446/52 |
| 2021/0323683 A1* | 10/2021 | Mastrolia | B64D 25/10 |

* cited by examiner

*Primary Examiner* — Timothy D Collins
*Assistant Examiner* — Terri L Filosi
(74) *Attorney, Agent, or Firm* — SNELL & WILMER L.L.P.

(57) ABSTRACT

A parachute retention system may include a container and a replaceable flap. The container can be attached to a vehicle and can hold a parachute. The container may have a first attachment member. A replaceable flap may have a second attachment member that connects to the first attachment member and that has a flexible barrier portion for enclosing at least a portion of the container to retain the parachute therein.

7 Claims, 13 Drawing Sheets

REPLACEABLE PARACHUTE CONTAINER FLAPS

FIELD

The present disclosure relates generally to containers, and more particularly, to replaceable flaps for parachute containers.

BACKGROUND

Current parachute containers, such as those which hold drogue parachutes attached to ejection seats, include flaps. The flaps cover an opening of the container to retain the parachute in the container, while also flexibly uncovering the opening of the container during a parachute deployment event. Currently flaps are permanently attached to a parachute container by fasteners or adhesives. As time in service passes, the periodic repacking of parachutes and the performance of other maintenance actions causes the flaps to wear out. When flaps are worn out, the container with permanently installed flaps must be removed from the ejection seat and replaced. This increases expense, extends the amount of time that an aircraft is unusable during maintenance, and increases the general difficulty of maintaining parachute containers with flaps.

SUMMARY

A parachute retention system is provided. The system may include a container attachable to a vehicle and configured to receive a parachute of the vehicle, the container having a first attachment member on the container. The system may include a replaceable flap having a flexible barrier portion for enclosing at least a portion of the container to retain the parachute therein and having a second attachment member for engaging with the first attachment member to secure the replaceable flap in selectable attachment to the container.

The vehicle may be an ejection seat. The parachute may be a drogue parachute. Various other aspects may also be included. For instance, the first attachment member may be a first hook and the second attachment member may be a second hook configured to engage with the first hook in mutual engagement.

The first hook may have a first flange and a second flange spaced apart by a first web that connects the first flange and the second flange. The second hook may have a first flange and a second flange spaced apart by a second web that connects the first flange of the second hook and the second flange of the second hook. The second flange of the first hook may be received into a space between the first and second flange of the second hook. The second flange of the second hook may be received into a space between the first and second flange of the first hook.

The first attachment member may be a slot. The second attachment member may be a tab insertable into the slot. The first attachment member may be a slot, and the second attachment member may be a ball insertable into the slot. The first attachment member may be a snap member and the second attachment member may be a conjugate snap member connectable to the snap member. The first attachment member may be a channel with a shield and the second attachment member may be a rolled end portion of the replaceable flap that extends from the flexible barrier portion and behind the shield into the channel. The first attachment member may be at least one fastener and the second attachment member may be a reinforced flange having at least one aperture to receive the at least one fastener. The first attachment member may be a channel, and the second attachment member may be a ball-shaped snap insertable into the channel. The first attachment member may be a double slot, and the second attachment member may be a strip of hook-and-loop fastener material extending from the flexible barrier portion and inserted through the double slot.

A cover for a parachute retention system is provided. The cover may be attachable to a container to receive a parachute, the container having a first attachment member. The cover includes a replaceable flap having a flexible barrier portion for enclosing at least a portion of the container to retain the parachute therein. The cover includes a second attachment member extending from the flexible barrier portion of the replaceable flap and selectably engageable with the first attachment member to secure the replaceable flap in selectable attachment to the container.

In various embodiments, the first attachment member includes a first hook, and the second attachment member includes a second hook configured to engage with the first hook in mutual engagement. The first hook may have a first flange and a second flange spaced apart by a first web that connects the first flange and the second flange. The second hook may have a first flange and a second flange spaced apart by a second web that connects the first flange of the second hook and the second flange of the second hook. The second flange of the first hook may be received into a space between the first and second flange of the second hook. The second flange of the second hook may be received into a space between the first and second flange of the first hook.

The first attachment member may be a slot. The second attachment member may be a tab insertable into the slot. The first attachment member may be a slot, and the second attachment member may be a ball insertable into the slot. The first attachment member may be a snap member and the second attachment member may be a conjugate snap member connectable to the snap member. The first attachment member may be a channel with a shield and the second attachment member may be a rolled end portion of the replaceable flap that extends from the flexible barrier portion and behind the shield into the channel. The first attachment member may be at least one fastener and the second attachment member may be a reinforced flange having at least one aperture to receive the at least one fastener. The first attachment member may be a channel, and the second attachment member may be a ball-shaped snap insertable into the channel. The first attachment member may be a double slot, and the second attachment member may be a strip of hook-and-loop fastener material extending from the flexible barrier portion and inserted through the double slot.

A method of manufacturing a cover for a parachute retention system is provided. The cover is attachable to a container to receive a parachute and the container has a first attachment member. The method includes providing a replaceable flap having a flexible barrier portion for enclosing at least a portion of the container to retain the parachute therein. The method includes affixing a second attachment member to and extending from the flexible barrier portion of the replaceable flap. The second attachment member is selectably engageable with the first attachment member to secure the replaceable flap in selectable attachment to the container.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Figure 1:
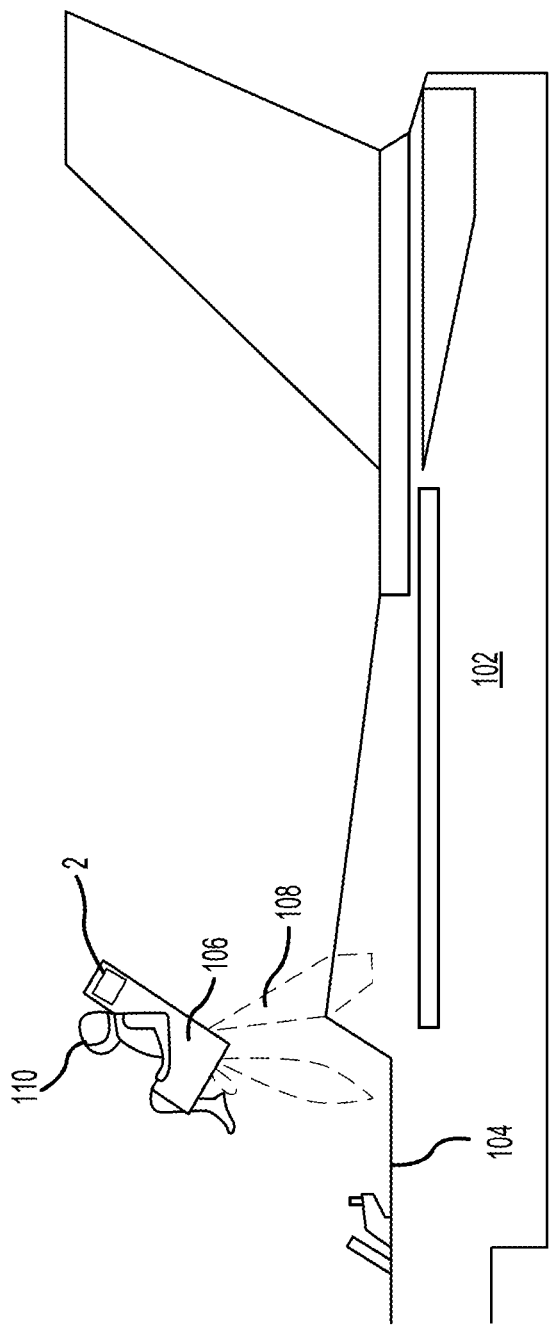
FIG. 1 illustrates an example view of an aircraft with an ejection seat having a parachute retention system, in accordance with various embodiments.

With reference to FIG. 1, an aircraft 102 is shown with an ejection seat 106. The ejection seat 106 is installed in the aircraft 102 to expel an occupant 110 of the ejection seat 106 from a cockpit 104 of the aircraft 102. The ejection seat 106 may be urged from cockpit 104 by a propellant 108. A parachute retention system 2 is installed in the ejection seat 106 and contains a parachute for deployment to stabilize the ejection seat 106.

Figure 2A:
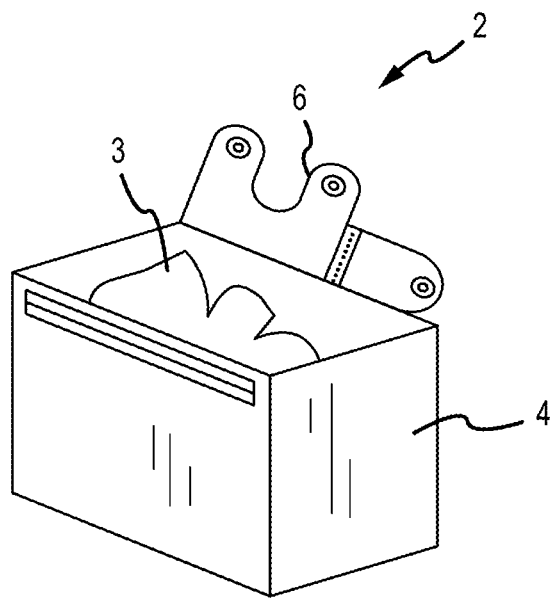
FIGS. 2A, 2B and 2C illustrate views of a parachute retention system, in accordance with various embodiments.
Figures 2B, 2C:
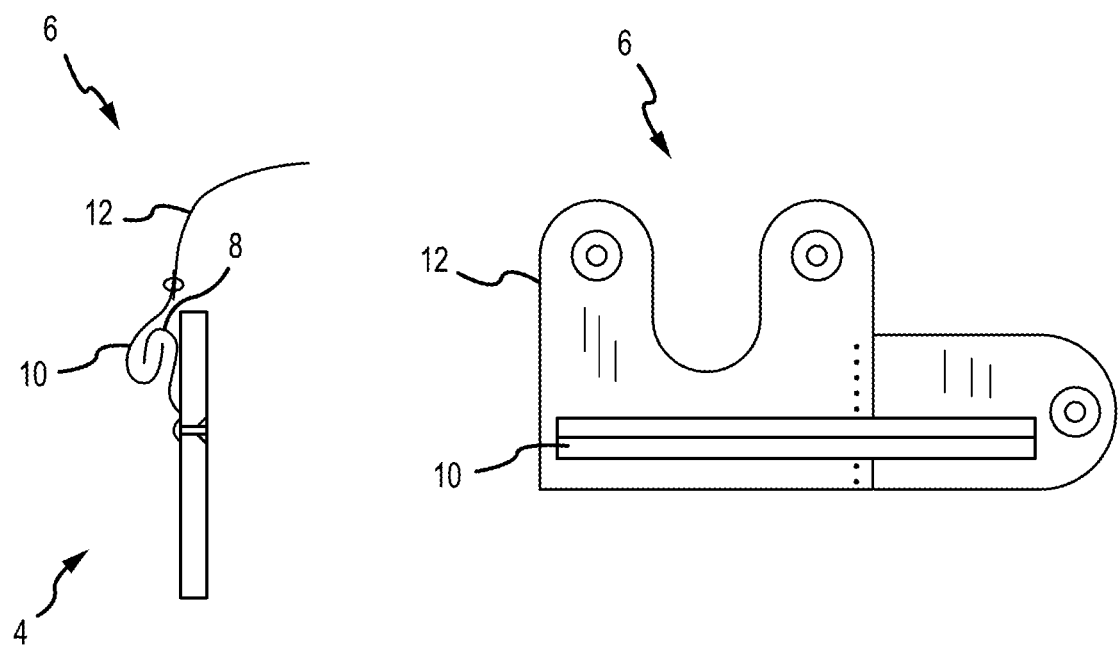

With reference to FIGS. 2A-C, various views of a parachute retention system 2 are shown. FIGS. 2A-C show cartoon representations of a parachute retention system 2 to introduce different parts of the system 2. Subsequent figures will show detailed representations of aspects of embodiments of the parachute retention system 2, however a discussion of FIGS. 2A-C to introduce these aspects is useful.

A parachute retention system 2 may include a container 4. A container 4 is an at least partial enclosure that a parachute 3 can be stored inside. The container 4 may be made of metal, or plastic, or a composite material, or any other material or combination of materials. The container 4 may have a parachute 3 stored therein. The parachute 3 may be a drogue parachute 3, such as a stabilizing drogue parachute of an ejection seat. A replaceable flap 6 may be attached to the container 4 and may cover an opening in the container 4. The replaceable flap 6 may close an opening of the container 4 but may also be selectably movable to open the opening of the container 4 upon deployment of the parachute 3. The container 4 may have a first attachment member 8 that is on a side of the container 4 and that attaches to the replaceable flap 6 to hold the replaceable flap 6 in connection to the container 4. The replaceable flap 6 may have a second attachment member 10 that is operable to connect to the first attachment member 8. By attaching the first attachment member 8 and the second attachment member 10 together, an associated replaceable flap 6 may be joined to the container 4. By disconnecting the first attachment member 8 and the second attachment member 10, the replaceable flap 6 may be disconnected from the container 4.

The replaceable flap 6 may have at least two aspects. For instance, each replaceable flap 6 may have a second attachment member 10, as described, and may also have a flexible barrier 12. The flexible barrier 12 may comprise a woven material, a non-woven material, a fabric, a polymeric material, a plastic material, a fiber material, or any other flexible material that is positionable to provide a barrier covering an opening of the container 4 but also movable to open the opening of the container 4 upon deployment of a parachute 3.

Figure 3:
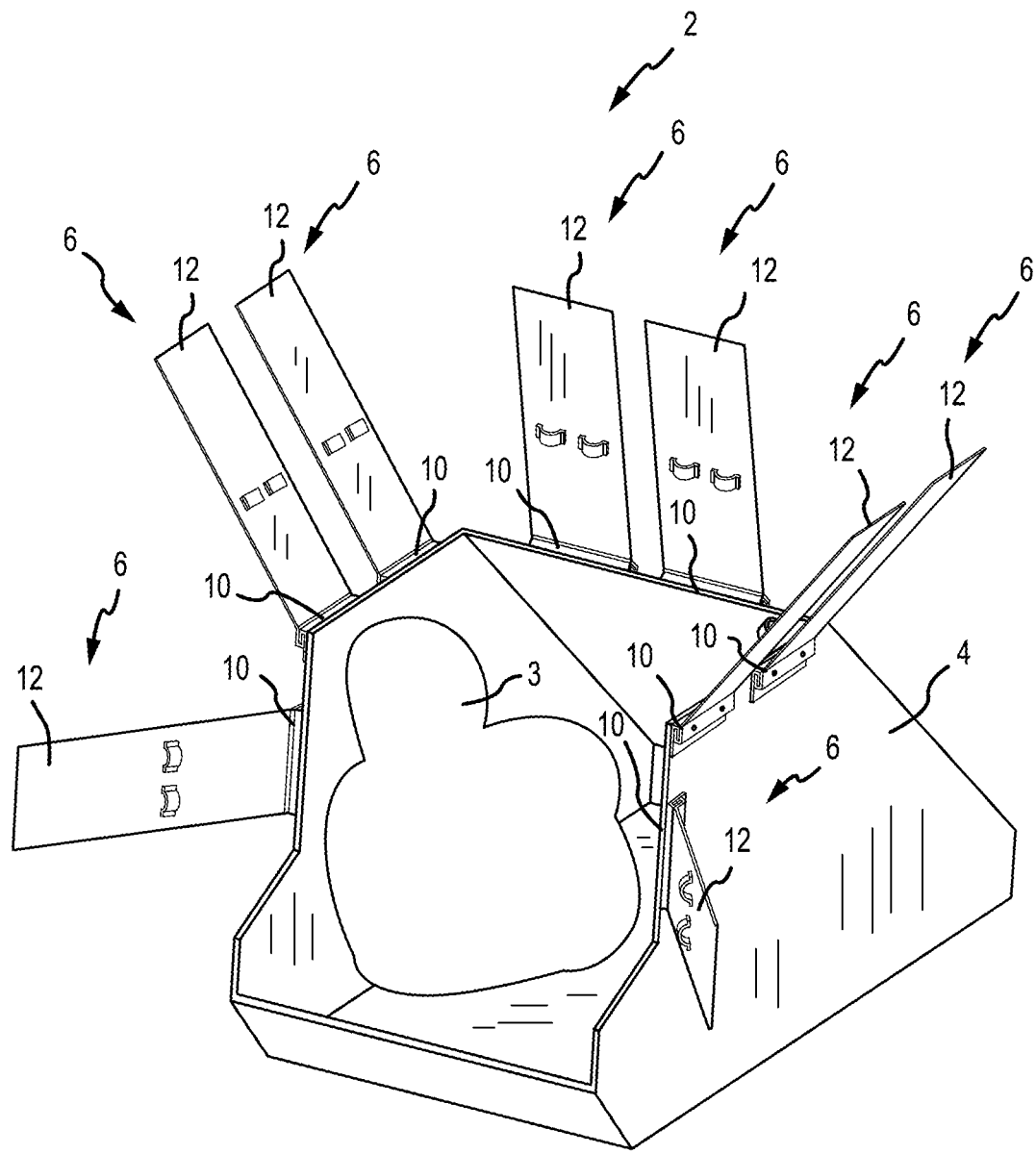
FIG. 3 illustrates a parachute retention system with a plurality of flaps, in accordance with various embodiments.

Turning to FIG. 3, an illustration is provided of a parachute retention system 2 having a container 4 with multiple replaceable flaps 6 to selectably enclose a parachute 3 in the container 4. Multiple replaceable flaps 6 may have second attachment members 10 that connect to corresponding first attachment members 8 (FIG. 2A-C) of the container 4. The replaceable flaps 6 each have a flexible barrier 12 that may fold over an opening of the container 4. The collection of flaps may connect to one another to further facilitate retention of the parachute 3 in the container 4. Thus, the parachute retention system 2 may include a container 4 attachable to a vehicle (e.g., an ejection seat) and configured to receive a parachute 3 of the vehicle. The parachute retention system 2 may also include a replaceable flap 6 having a flexible barrier 12 portion for enclosing at least a portion of the container 4 to retain the parachute 3 therein and having a second attachment member 10 for engaging the first attachment member 8 (FIG. 2A-C) to secure the replaceable flap 6 in selectable attachment to the container 4.

Referring to FIGS. 1-3, the various embodiments discussed herein may be provided as a parachute retention system 2 with both a container 4 and a replaceable flap 6, or in other instances, may be provided as a cover for a parachute retention system 2, the cover being a replaceable flap 6. For instance, a cover may be provided for a parachute retention system 2, the cover attachable to a container 4 to receive a parachute 3, the container 4 having a first attachment member 8. The cover may include a replaceable flap 6 having a flexible barrier 12 portion for enclosing at least a portion of the container 4 to retain the parachute 3 therein. The cover may include a second attachment member 10 extending from the flexible barrier 12 portion of the replaceable flap 6 and selectably engageable with the first attachment member 8 to secure the replaceable flap 6 in selectable attachment to the container 4.

Figure 4A:
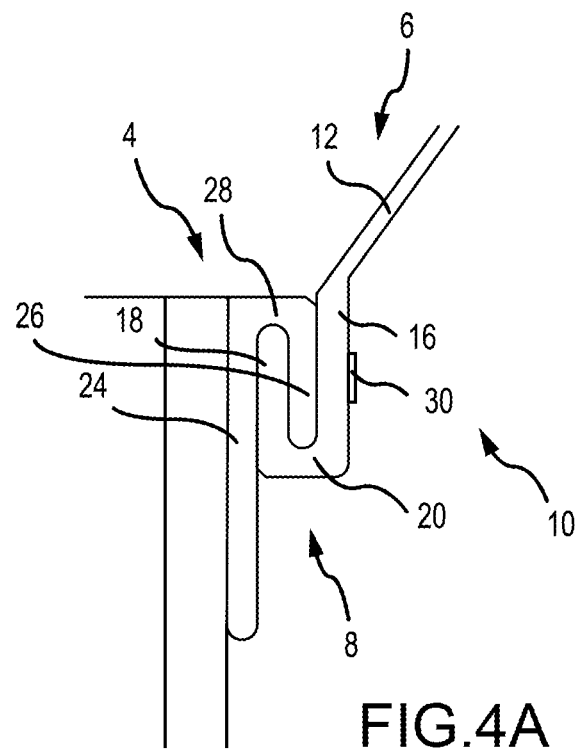
FIGS. 4A-4B illustrate a parachute retention system having interconnecting hooks, in accordance with various embodiments.
Figure 4B:
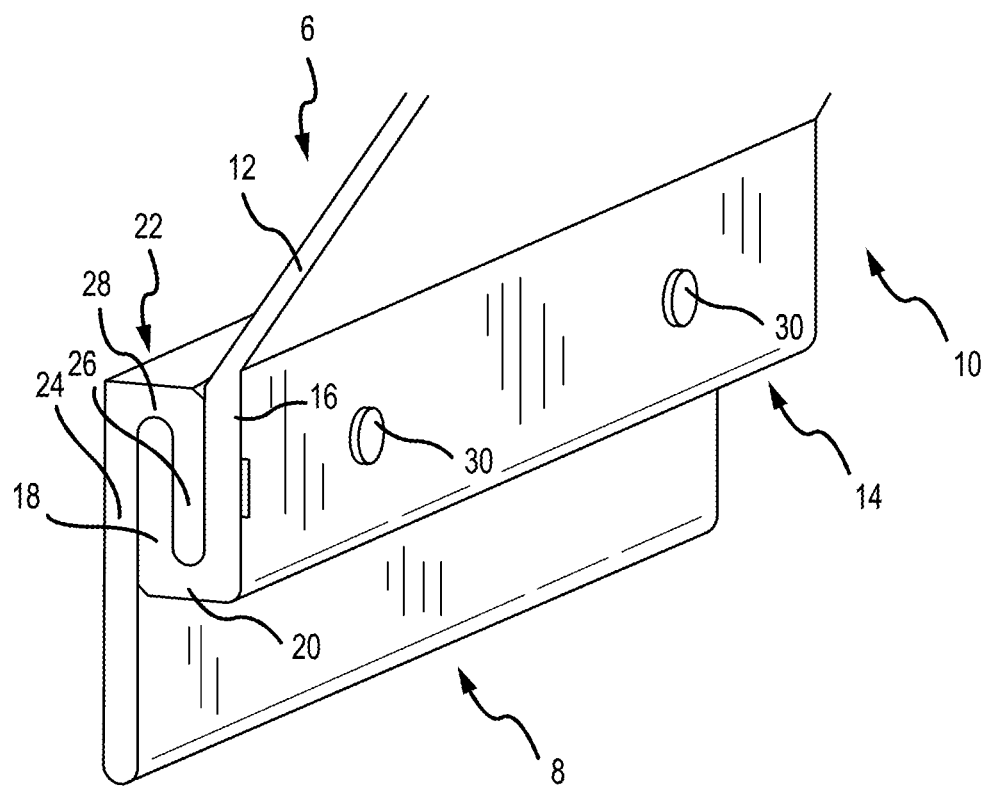

Different example configurations of the first attachment member 8 and the second attachment member 10 are possible. These different configurations are all operable to join a replaceable flap 6 to a container 4. In some instances, a first attachment member 8 of the container 4 may join multiple replaceable flap 6 to the container 4. With reference to FIGS. 4A-B, the first attachment member 8 may include a first hook 22 and the second attachment member 10 may include a second hook 14 configured to engage with the first hook 22. The hooks may connect in mutual engagement. For instance, the first hook 22 may have a first flange 24 and a second flange 26 with a web member 28 that connects the first flange 24 of the first hook 22 to the second flange 26 of the first hook 22 in spaced-apart relation. Similarly, the second hook 14 may have a first flange 16 and a second flange 18 with a web member 20 that connects the first flange 16 of the second hook 14 and the second flange 18 of the second hook 14 in spaced-apart relation. The second flange 26 of the first hook 22 is received into a space between the first flange 16 and second flange 18 of the second hook 14. The second flange 18 of the second hook 14 is received into a space between the first flange 24 of the first hook 22 and the second flange 26 of the first hook 22. In various embodiments, the first attachment member 8 also includes one or more fasteners 30, such as rivets, bolts, pins, or the like, that penetrate through the first hook 22 and the second hook 14 to retain the hooks in interlocked mutual engagement.

Figure 5A:
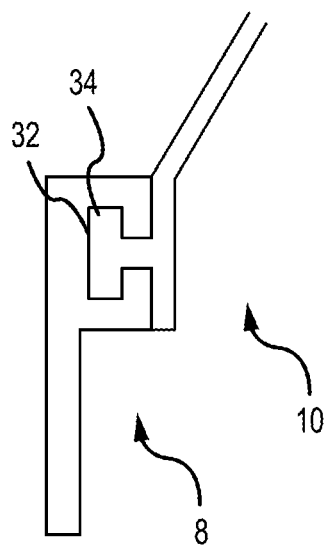
FIGS. 5A-5B illustrate a parachute retention system having an interconnecting rail tab and rail slot, in accordance with various embodiments.
Figure 5B:
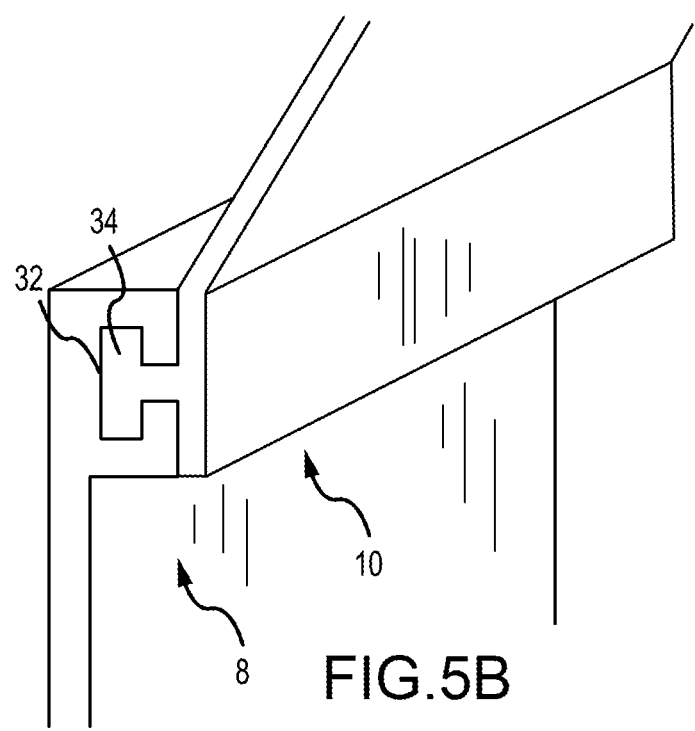

With reference to FIGS. 5A-B, the first attachment member 8 may include a rail slot 32 and the second attachment member 10 may include a rail tab 34. A rail slot 32 may comprise a slot having a profile and a rail tab 34 may comprise a tab that has a profile, where the profiles correspond to each other so that the tab is insertable into the slot and can be retained in the slot in at least one or more direction by the geometry of the profiles. For instance, a rail tab 34 may comprise a longitudinal rail that has a cross-sectional profile and a rail slot may comprise a longitudinal rail that has a cross-sectional profile defining an opening to receive the rail tab 34. The rail tab 34 may be slidably inserted into a rail slot 32.

Figure 6A:
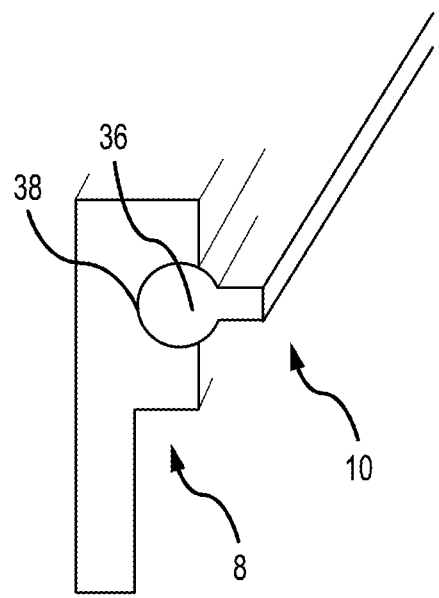
FIGS. 6A-6B illustrate a parachute retention system having an interconnecting ball member and slot member, in accordance with various embodiments.
Figure 6B:
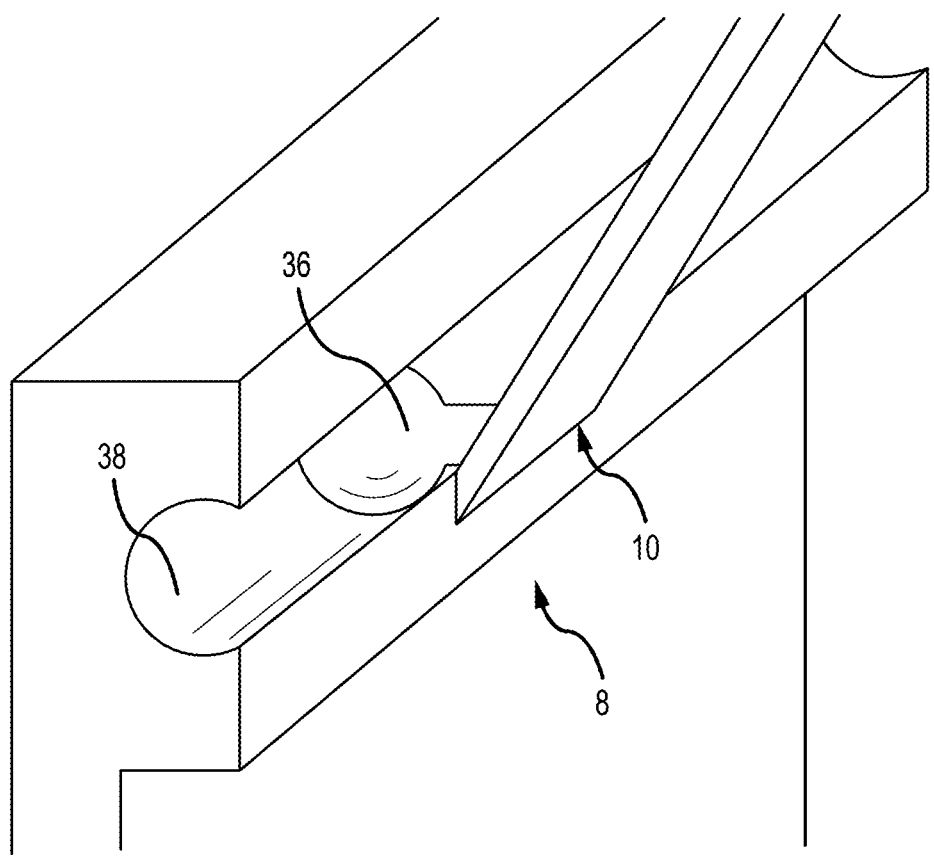

With reference to FIGS. 6A-B, the first attachment member 8 may include a ball slot 38 and the second attachment member 10 may include a ball member 36. A ball slot 38 may comprise a slot having a profile and a ball member 36 may comprise a sphere or other spheroid, or curved shape that has a profile, wherein the profiles correspond to each other so that the ball member 36 is insertable into the ball slot 38 and can be retained in the slot in at least one or more direction by the geometry of the profiles. For instance, a ball slot 38 may comprise a longitudinal rail that has a cross sectional profile cut to receive the ball member 36. The ball member 36 may be slidably inserted into the ball slot 38.

Figure 7A:
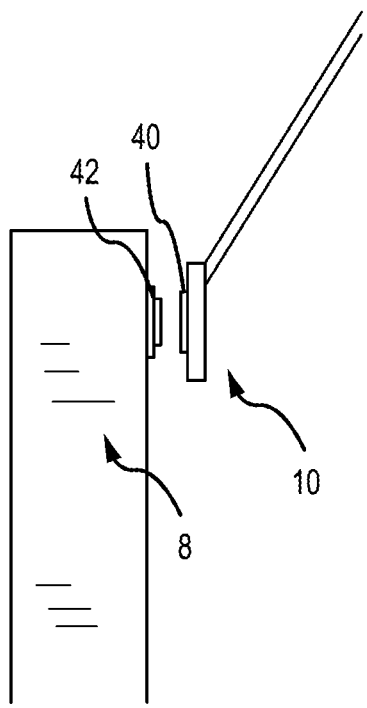
FIGS. 7A-7B illustrate a parachute retention system having interconnecting snap members, in accordance with various embodiments.
Figure 7B:
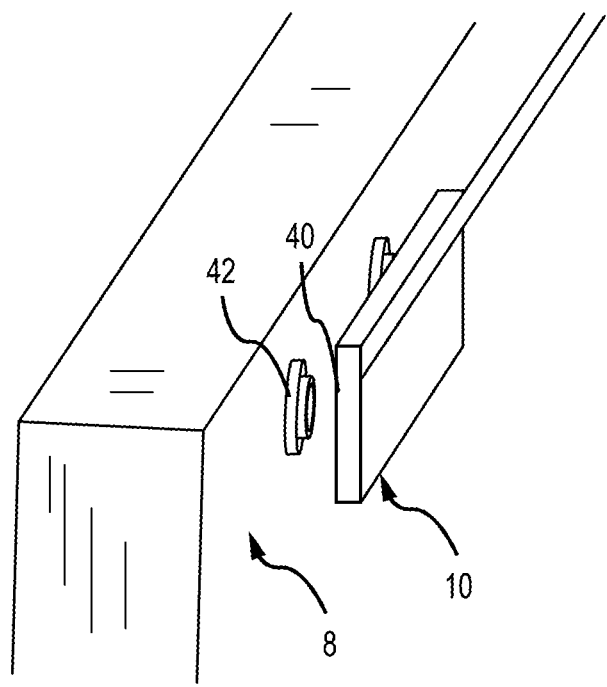

With reference to FIGS. 7A-B, the first attachment member 8 may include a first snap member 42 and the second attachment member 10 may include a second snap member 40. The first snap member 42 and the second snap member 40 may selectably be connected together, such as by press fitting together, and may selectably be disconnected, such as by pulling apart. Thus, the second attachment member 10 comprises a conjugate snap member connectable to the snap member of the first attachment member 8.

Figure 8A:
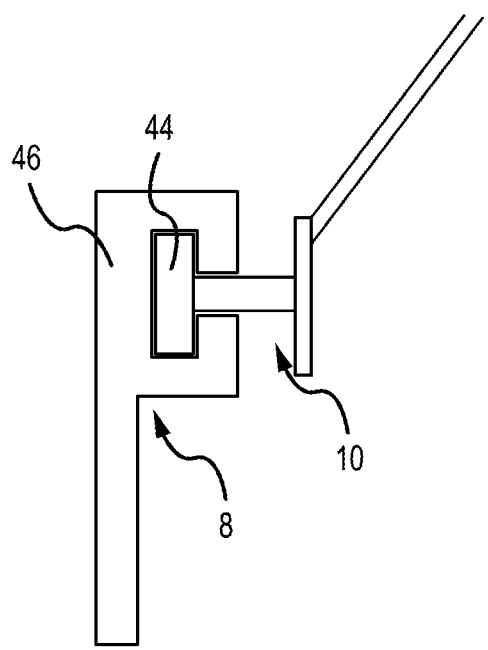
FIGS. 8A-8B illustrate a parachute retention system having an interconnecting disc tab and slot member, in accordance with various embodiments.
Figure 8B:
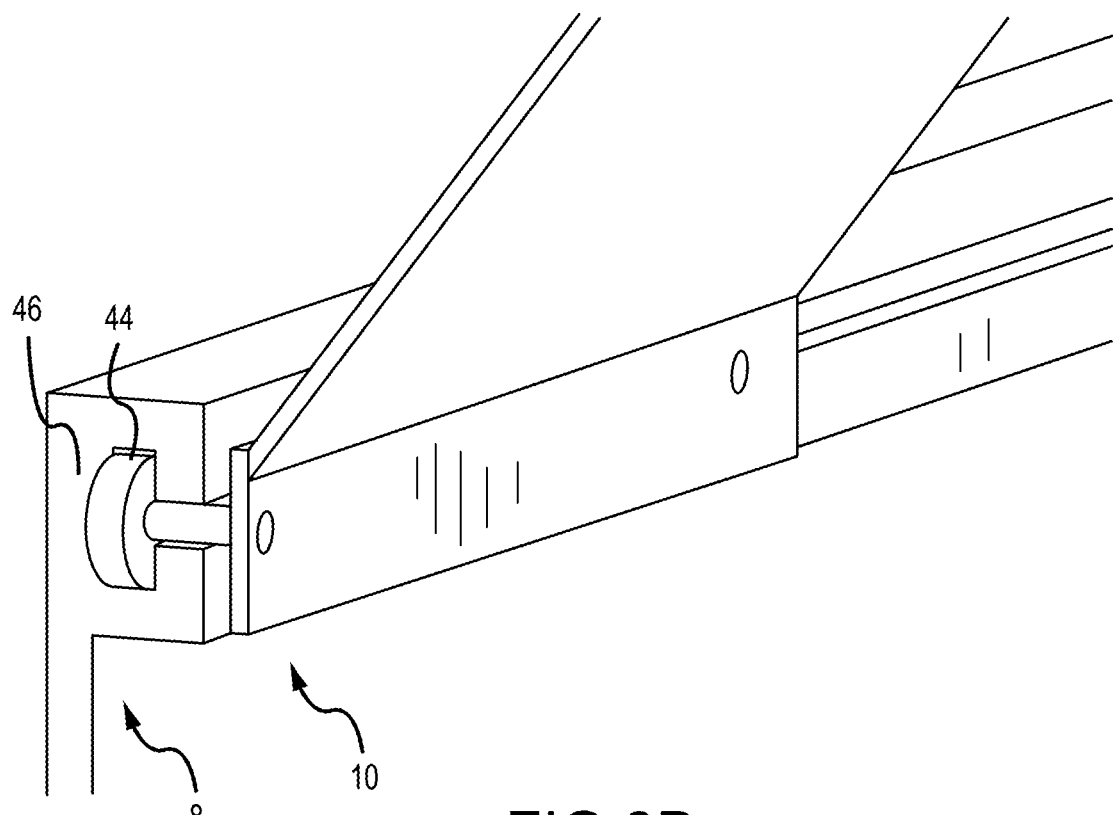

With reference to FIGS. 8A-B, the first attachment member 8 may include a disc slot 46 and the second attachment member 10 may include a disc tab 44. A disc slot 46 may comprise a slot having a profile and a disc tab 44 may comprise a tab that has a profile, where the profiles partially correspond to each other so that the tab is insertable into the slot and can be retained in the slot in at least one or more direction by the geometry of the profiles. For instance, a disc tab 44 may comprise a circular boss that has a cross-sectional profile and a disc slot 46 may comprise a longitudinal rail that has a cross-sectional profile cut to receive the disc tab 44. The disc tab 44 may be slidably inserted into a disc slot 46.

Figure 9A:
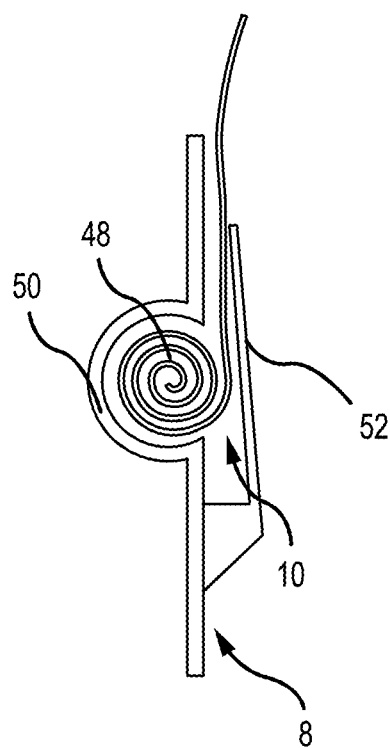
FIGS. 9A-9B illustrate a parachute retention system having a rolled end that inserts into a channel with a shield, in accordance with various embodiments.
Figure 9B:
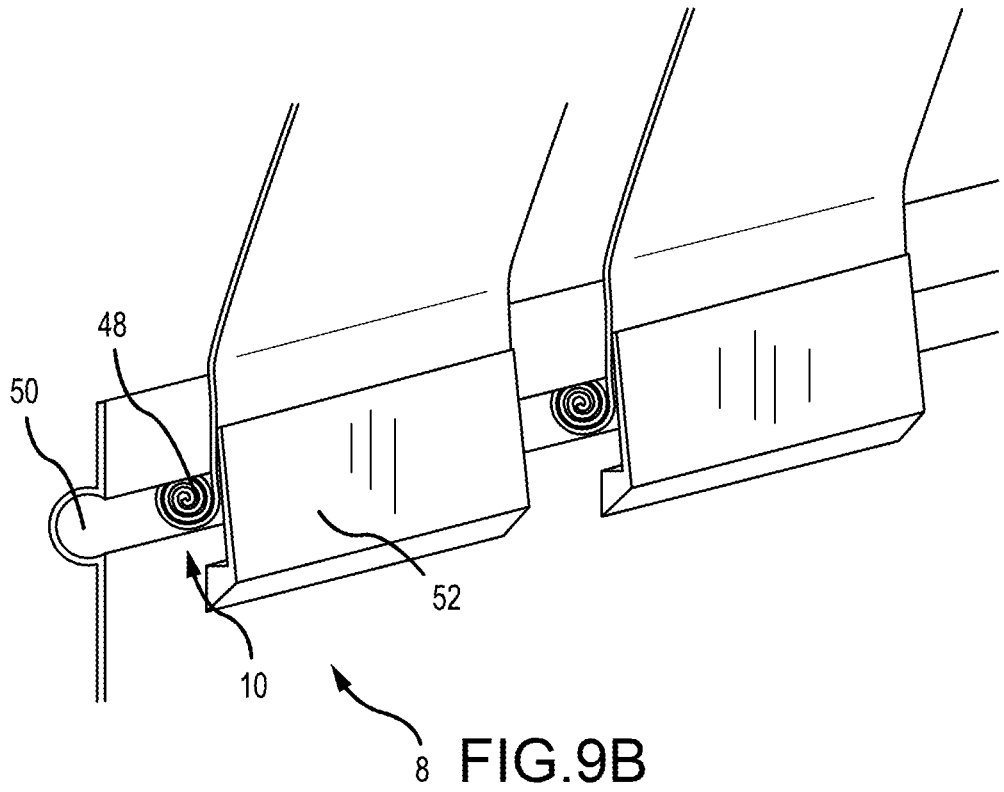

With reference to FIGS. 9A-B, the first attachment member 8 may include a channel 50 and a shield 52. A shield 52 may be a cantilevered flange that partially encloses the channel 50. For instance, a second attachment member 10 may include a rolled end 48 of a replaceable flap 6 (FIGS. 2A-C) that extends from the flexible barrier portion and behind the shield 52 into the channel 50. The rolled end 48 may be inserted into the channel 50 and the shield 52 may at least partially cover the channel 50 to enhance retention of the rolled end 48 in the channel 50.

Figure 10A:
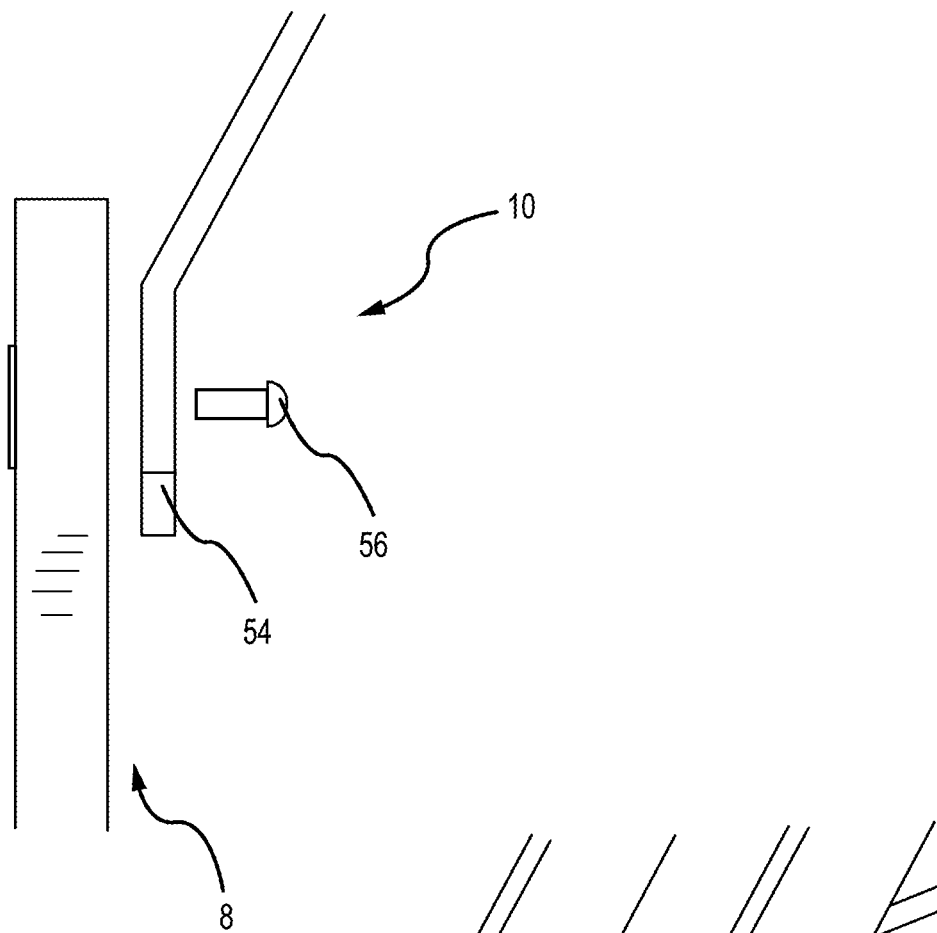
FIGS. 10A-10B illustrate a parachute retention system having a reinforced flange that connects via fasteners, in accordance with various embodiments.
Figure 10B:
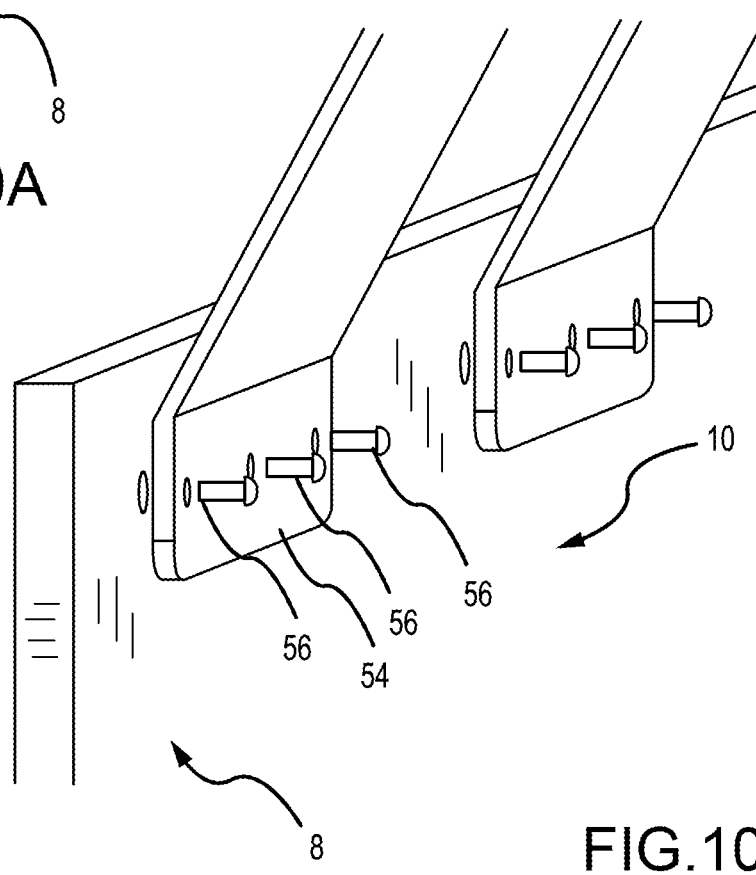

With reference to FIGS. 10A-B, the first attachment member 8 may include one or more fasteners 56 and the second attachment member 10 may include a reinforced flange 54. The reinforced flange 54 may have one or more aperture to receive the fasteners 56. The fasteners 56 may pass through the one or more aperture of the reinforced flange 54 and into the container 4 (FIGS. 2A-C) to hold the replaceable flap 6 (FIGS. 2A-C) in connection to the container 4 (FIGS. 2A-C). The reinforced flange 54 may comprise a localized stiffening of the replaceable flap 6 (FIGS. 2A-C). The stiffening may be a member made of metal or plastic or carbon or fiber or fiber-reinforced plastic, or a combination thereof. The stiffening member attached to or inserted into the replaceable flap 6 (FIGS. 2A-C). The stiffening may be a region of the replaceable flap 6 that is treated to enhance rigidity, such as by coating or saturating with resin, glue, or the like. The fasteners 56 may be rivets, or bolts, or pins, or any other fastener.

Figure 11A:
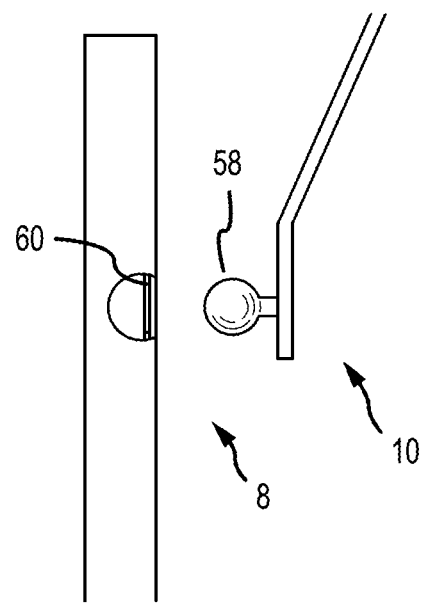
FIGS. 11A-11B illustrate a parachute retention system having a ball snap and receiving channel, in accordance with various embodiments.
Figure 11B:
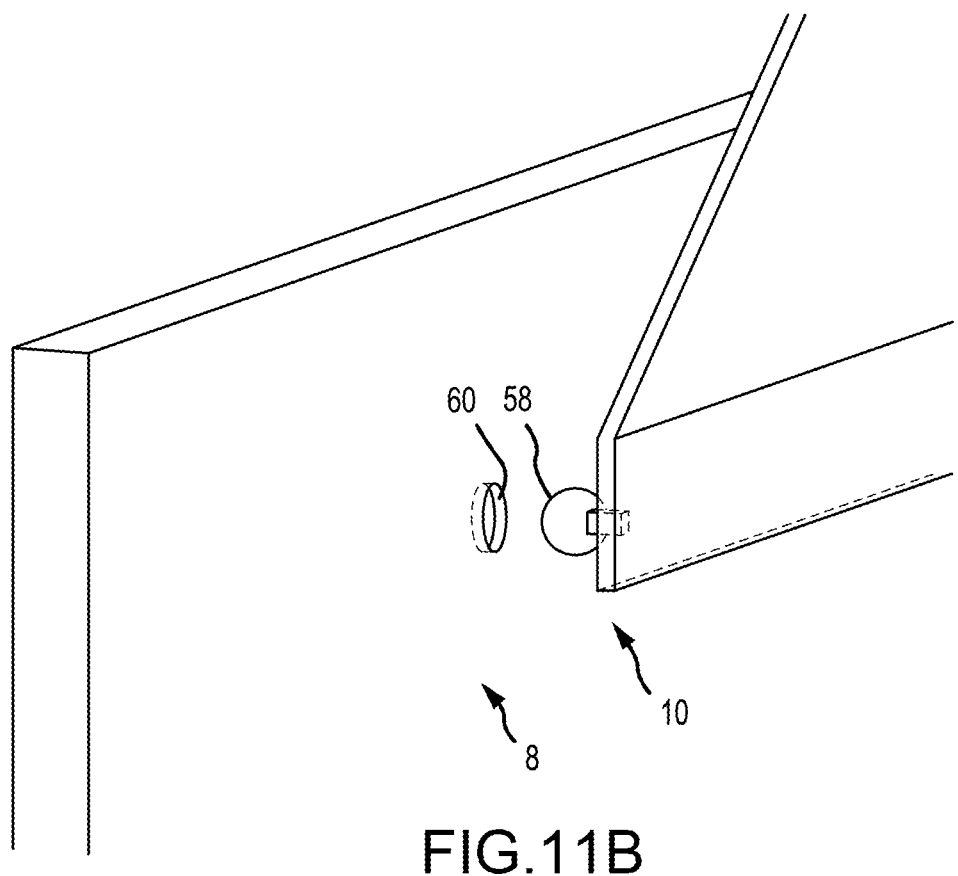

With reference to FIGS. 11A-B, the first attachment member 8 may include one or more receiving channel 60, such as a surface penetration defined into a surface of the container 4 (FIGS. 2A-C) and shaped to receive an aspect of the second attachment member 10. The second attachment member 10 may include a ball-shaped snap 58. The ball-shaped snap 58 may be a spherical boss that can snap into the receiving channel 60, and that can snap out of the receiving channel 60, the ball-shaped snap 58 resisting snapping out of the receiving channel 60 in an absence of sufficient applied tension.

Figure 12A:
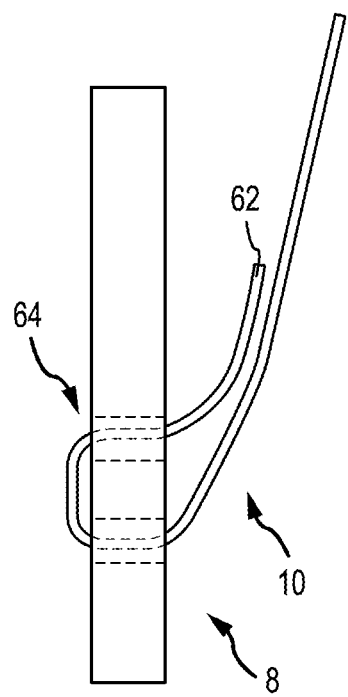
FIGS. 12A-12B illustrate a parachute retention system having a hook-and-loop fastener, in accordance with various embodiments.
Figure 12B:
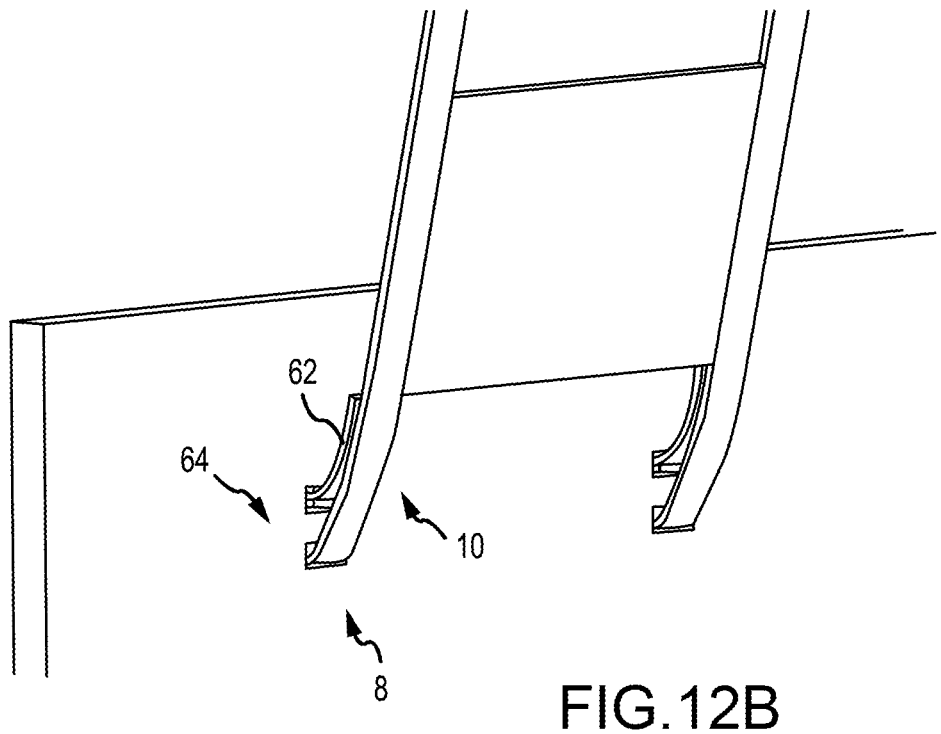

With reference to FIGS. 12A-B, the first attachment member 8 may include a slot set 64. A slot set may be a double slot. The double slot may be a set of two spaced apart slots through a surface of the container 4 (FIG. 2A-C). In various embodiments, the slot set may include other multiple numbers of slots. The second attachment member 10 may include a strip of hook-and-loop fastener material 62 extending from the flexible barrier 12 (FIGS. 2A-C) of the replaceable flap 6 (FIGS. 2A-C) and inserted through the double slot 64.

Figure 13:
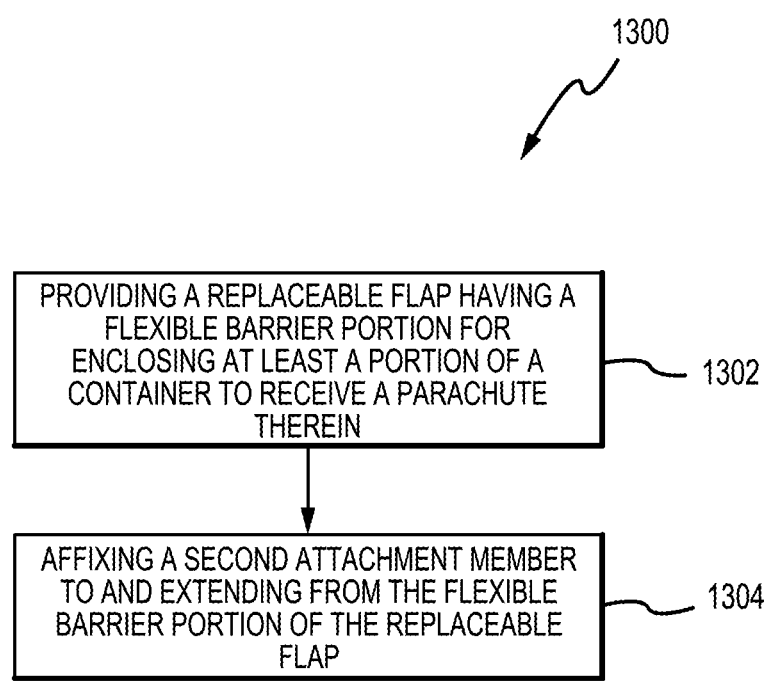
FIG. 13 illustrates a method of manufacturing a cover for a parachute retention system, in accordance with various embodiments.

With reference to FIG. 13, a method 1300 of manufacturing a cover for a parachute retention system is provided. The cover may be attachable to a container to receive a parachute. The container may have a first attachment member. The method may include providing a replaceable flap having a flexible barrier portion for enclosing at least a portion of the container to retain the parachute therein (block 1302). The method may include affixing a second attachment member to and extending from the flexible barrier portion of the replaceable flap (block 1304). The second attachment member may be selectably engageable with the first attachment member to secure the replaceable flap in selectable attachment to the container. FIGS. 4A-12B illustrate a few mechanisms for such selectable engagement.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to invoke 35 U.S.C. 115(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A parachute retention system comprising:
    a container attachable to a vehicle and configured to receive a parachute of the vehicle, the container having a first attachment member on the container, wherein the first attachment member comprises a first hook;
    a replaceable flap having a flexible barrier portion for enclosing at least a portion of the container to retain the parachute therein, a first end of the flexible barrier portion configured to be un-secured in response to deployment of the parachute, and a second end of the flexible barrier portion configured to pivot with respect to the container in response to deployment of the parachute, and having a second attachment member disposed at the second end and comprising a second hook configured to engage with the first hook in mutual engagement to secure the replaceable flap in selectable attachment to the container.

2. The parachute retention system according to claim 1, wherein the vehicle is an ejector seat.

3. The parachute retention system according to claim 1, wherein the parachute is a drogue parachute.

4. The parachute retention system according to claim 1, wherein the first hook has a first flange and a second flange spaced apart by a first web that connects the first flange and the second flange, and wherein the second hook has a first flange and a second flange spaced apart by a second web that connects the first flange of the second hook and the second flange of the second hook,
    wherein the second flange of the first hook is received into a space between the first and second flange of the second hook, and
    wherein the second flange of the second hook is received into a space between the first and second flange of the first hook.

5. A cover for a parachute retention system, the cover attachable to a container to receive a parachute, the container having a first attachment member comprising a first hook, wherein the cover comprises:
    a replaceable flap having a flexible barrier portion for enclosing at least a portion of the container to retain the parachute therein, a first end of the flexible barrier portion configured to be un-secured in response to deployment of the parachute, and a second end of the flexible barrier portion configured to pivot with respect to the container in response to deployment of the parachute; and
    a second attachment member disposed at the second end, extending from the flexible barrier portion of the replaceable flap, and selectably engageable with the first attachment member via a second hook to secure the replaceable flap in selectable attachment to the container.

6. The parachute retention system according to claim 5, wherein the first hook has a first flange and a second flange spaced apart by a first web that connects the first flange and the second flange, and wherein the second hook has a first flange and a second flange spaced apart by a second web that connects the first flange of the second hook and the second flange of the second hook,
   wherein the second flange of the first hook is received into a space between the first and second flange of the second hook, and
   wherein the second flange of the second hook is received into a space between the first and second flange of the first hook.

7. A method of manufacturing a cover for a parachute retention system, the cover attachable to a container to receive a parachute, the container having a first attachment member, wherein the method comprises:
   providing a replaceable flap having a flexible barrier portion for enclosing at least a portion of the container to retain the parachute therein, a first end of the flexible barrier portion configured to be un-secured in response to deployment of the parachute, and a second end of the flexible barrier portion configured to pivot with respect to the container in response to deployment of the parachute; and
   affixing a second attachment member to and extending from the second end of the flexible barrier portion of the replaceable flap,
   wherein the second attachment member is selectably engageable with the first attachment member to secure the replaceable flap in selectable attachment to the container.

* * * * *